United States Patent
Lockton et al.

(10) Patent No.: US 9,908,053 B2
(45) Date of Patent: *Mar. 6, 2018

(54) METHODS AND APPARATUS FOR DISTRIBUTED GAMING OVER A MOBILE DEVICE

(71) Applicant: Winview, Inc., Redwood City, CA (US)

(72) Inventors: David B. Lockton, Redwood City, CA (US); Mark K. Berner, Santa Clara, CA (US); Mark J. Micheli, San Francisco, CA (US)

(73) Assignee: Winview, Inc., Carmel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,873

(22) Filed: Oct. 18, 2016

(65) Prior Publication Data
US 2017/0036117 A1   Feb. 9, 2017

Related U.S. Application Data

(63) Continuation of application No. 14/491,801, filed on Sep. 19, 2014, now Pat. No. 9,504,922, which is a (Continued)

(51) Int. Cl.
*G06F 19/00* (2011.01)
*A63F 13/75* (2014.01)
(Continued)

(52) U.S. Cl.
CPC ............ *A63F 13/75* (2014.09); *A63F 13/332* (2014.09); *A63F 13/35* (2014.09); *A63F 13/352* (2014.09);
(Continued)

(58) Field of Classification Search
CPC ................ A63F 13/12; A63F 2300/552; A63F 2300/5586; A63F 2300/535
(Continued)

(56) References Cited

U.S. PATENT DOCUMENTS

| 4,141,548 A | 2/1979 | Everton |
| 4,270,755 A | 6/1981 | Willhide et al. |

(Continued)

FOREIGN PATENT DOCUMENTS

| CA | 2252074 | 11/1997 |
| CA | 2252021 | 11/1998 |

(Continued)

OTHER PUBLICATIONS

Two Way TV Patent and Filing Map www.twowaytv.com/version4/technologies/tech_patents.asp.
(Continued)

*Primary Examiner* — Michael Cuff
(74) *Attorney, Agent, or Firm* — Haverstock & Owens LLP

(57) ABSTRACT

Some embodiments of the invention provide a method and system for detecting unusual performance in a game. The game has a participant. The method calculates for the participant, a performance metric. The method compares the performance metric to a threshold value. Based on the comparison, the method optionally connects to a server. In some embodiments, the connection is for uploading a set of data from the participant to the server. The server, of some embodiments, broadcasts to the participant. The broadcast is a one-way transmission. In some embodiments, the broadcast includes a distribution based on a set of sample participants. In these embodiments, the set of sample participants comprises a representative sample of all the participants in the game. The threshold value, of some embodiments, is based on the broadcast and in some embodiments, the broadcast includes a histogram. The connecting occurs, in some embodiments, when the performance metric exceeds the threshold value. The connection, for some embodiments, includes a two-way connection. In
(Continued)

some embodiments, the method also tracks for the participant, a participant improvement factor. The participant improvement factor is based on an average performance level for the participant. The method stores the participant improvement factor. The threshold value, in some of these embodiments, is based on the participant improvement factor. The method of some embodiments tracks for the game, a game improvement factor. The game improvement factor is based on an average performance level for several participants in the game. The method stores the game improvement factor. The threshold value, in some of these embodiments, is based on the game improvement factor. In some embodiments, the method examines the uploaded data for particular characteristics. In some embodiments, the particular characteristics indicate the likelihood of cheating activity.

33 Claims, 7 Drawing Sheets

Related U.S. Application Data continuation of application No. 11/166,596, filed on Jun. 24, 2005, now Pat. No. 8,870,639.

(60) Provisional application No. 60/588,273, filed on Jul. 14, 2004, provisional application No. 60/583,739, filed on Jun. 28, 2004.

(51) Int. Cl.
　　*A63F 13/79*　　　(2014.01)
　　*A63F 13/35*　　　(2014.01)
　　*A63F 13/77*　　　(2014.01)
　　*A63F 13/332*　　(2014.01)
　　*A63F 13/352*　　(2014.01)

(52) U.S. Cl.
　　CPC ............. *A63F 13/77* (2014.09); *A63F 13/79* (2014.09); *A63F 2300/535* (2013.01); *A63F 2300/552* (2013.01); *A63F 2300/558* (2013.01); *A63F 2300/5586* (2013.01)

(58) Field of Classification Search
　　USPC .......................................... 463/42, 1, 29, 40
　　See application file for complete search history.

(56) References Cited

U.S. PATENT DOCUMENTS

| | | |
|---|---|---|
| 4,496,148 A | 1/1985 | Morstain et al. |
| 4,592,546 A | 6/1986 | Fascenda et al. |
| 4,816,904 A | 3/1989 | McKenna et al. |
| 5,013,038 A | 5/1991 | Luvenberg |
| 5,035,422 A | 7/1991 | Berman |
| 5,073,931 A | 12/1991 | Audebert et al. |
| 5,083,271 A | 1/1992 | Thatcher et al. |
| 5,083,800 A | 1/1992 | Lockton |
| 5,119,295 A | 6/1992 | Kapur |
| 5,120,076 A | 6/1992 | Luxenberg et al. |
| 5,213,337 A | 5/1993 | Sherman |
| 5,227,874 A | 7/1993 | Von Kohom |
| 5,256,863 A | 10/1993 | Ferguson |
| 5,263,723 A | 11/1993 | Pearson et al. |
| 5,283,734 A | 2/1994 | Von Kohom |
| 5,327,485 A | 7/1994 | Leaden |
| 5,343,236 A | 8/1994 | Koppe et al. |
| 5,343,239 A | 8/1994 | Lappington et al. |
| 5,417,424 A | 5/1995 | Snowden |
| 5,462,275 A | 10/1995 | Lowe et al. |
| 5,479,492 A | 12/1995 | Hofstee et al. |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,628,684 A | 5/1997 | -Etienne |
| 5,643,088 A | 7/1997 | Vaughn et al. |
| 5,663,757 A | 9/1997 | Morales |
| 5,759,101 A | 6/1998 | Won Kohom |
| 5,761,606 A | 6/1998 | Wolzien |
| 5,762,552 A | 6/1998 | Voung et al. |
| 5,764,275 A | 6/1998 | Lappington et al. |
| 5,813,913 A | 9/1998 | Berner et al. |
| 5,818,438 A | 10/1998 | Howe et al. |
| 5,838,774 A | 11/1998 | Weiser, Jr. |
| 5,860,862 A | 1/1999 | Junkin |
| 5,916,024 A | 6/1999 | Von Kohom |
| 5,870,683 A | 9/1999 | Wells et al. |
| 5,970,143 A | 10/1999 | Schneier et al. |
| 5,971,854 A | 10/1999 | Pearson et al. |
| 5,987,440 A | 11/1999 | O'Neil et al. |
| 6,009,458 A | 12/1999 | Hawkins et al. |
| 6,016,337 A | 1/2000 | Pykalisto |
| 6,117,013 A | 9/2000 | Elba |
| 6,126,543 A | 10/2000 | Friedman |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,267,670 B1 | 7/2001 | Walker |
| 6,293,868 B1 | 9/2001 | Bernard |
| 6,312,336 B1 | 11/2001 | Handelman et al. |
| 6,373,462 B1 | 4/2002 | Pan |
| 6,411,969 B1 | 6/2002 | Tam |
| 6,416,414 B1 | 7/2002 | Stadelmann |
| 6,425,828 B2 | 7/2002 | Walker et al. |
| 6,434,398 B1 | 8/2002 | Inselberg |
| 6,470,180 B1 | 10/2002 | Kotzin et al. |
| 6,524,189 B1 | 2/2003 | Rautila |
| 6,527,641 B1 | 3/2003 | Sinclair et al. |
| 6,530,082 B1 | 3/2003 | Del Sesto et al. |
| 6,536,037 B1 | 3/2003 | Guheen et al. |
| 6,578,068 B1 | 6/2003 | Bowma-Amuah |
| 6,594,098 B1 | 7/2003 | Sutardja |
| 6,604,997 B2 | 7/2003 | Saidakovsky et al. |
| 6,610,953 B1 | 8/2003 | Tao et al. |
| 6,648,760 B1 | 11/2003 | Nicastro |
| 6,659,860 B1 | 12/2003 | Yamamoto et al. |
| 6,659,872 B1 | 12/2003 | Kaufman et al. |
| 6,690,661 B1 | 2/2004 | Agarwal et al. |
| 6,718,350 B1 | 4/2004 | Karbowski |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Inseilberg |
| 6,763,377 B1 | 7/2004 | Balknap et al. |
| 6,766,524 B1 | 7/2004 | Matheny et al. |
| 6,774,926 B1 | 8/2004 | Ellis et al. |
| 6,785,561 B1 | 8/2004 | Kim |
| 6,801,380 B1 | 10/2004 | Saturdja |
| 6,806,889 B1 | 10/2004 | Malaure et al. |
| 6,807,675 B1 | 10/2004 | Millard et al. |
| 6,811,482 B2 | 11/2004 | Letovsky |
| 6,817,947 B2 | 11/2004 | Tanskanen |
| 6,824,469 B2 | 11/2004 | Allibhoy et al. |
| 6,840,861 B2 | 1/2005 | Jordan et al. |
| 6,846,239 B2 | 1/2005 | Washio |
| 6,857,122 B1 | 2/2005 | Takeda et al. |
| 6,863,610 B2 | 3/2005 | Vancraeynest |
| 6,871,226 B1 | 3/2005 | Ensley et al. |
| 6,873,610 B1 | 3/2005 | Noever |
| 6,884,172 B1 | 4/2005 | Lloyd et al. |
| 6,887,159 B2 | 5/2005 | Leen et al. |
| 6,888,929 B1 | 5/2005 | Saylor |
| 6,893,347 B1 | 5/2005 | Zilliacus et al. |
| 6,898,762 B2 | 5/2005 | Ellis et al. |
| 6,942,574 B1 | 9/2005 | LeMay et al. |
| 6,960,088 B1 | 11/2005 | Long |

(56) References Cited

U.S. PATENT DOCUMENTS

| | | |
|---|---|---|
| 7,035,653 B2 | 4/2006 | Simon et al. |
| 7,116,310 B1 | 10/2006 | Evans et al. |
| 7,125,336 B2 | 10/2006 | Anttila et al. |
| 7,169,050 B1 | 1/2007 | Tyler |
| 7,192,352 B2 | 3/2007 | Walker et al. |
| 7,194,758 B1 | 3/2007 | Waki et al. |
| 7,240,093 B1 | 7/2007 | Danieli et al. |
| 7,244,181 B2 | 7/2007 | Wang et al. |
| 7,254,605 B1 | 8/2007 | Strum |
| 7,288,027 B2 | 10/2007 | Overton |
| 7,347,781 B2 | 3/2008 | Schultz |
| 7,351,149 B1 | 4/2008 | Simon et al. |
| 7,379,705 B1 | 5/2008 | Rados et al. |
| 7,502,610 B2 | 3/2009 | Maher |
| 7,517,282 B1 | 4/2009 | Pryor |
| 7,562,134 B1 | 7/2009 | Fingerhut et al. |
| 7,630,986 B1 | 12/2009 | Herz et al. |
| 7,753,772 B1 | 7/2010 | Walker |
| 7,753,789 B2 | 7/2010 | Walker et al. |
| 7,780,528 B2 | 8/2010 | Hirayama |
| 7,828,661 B1 | 11/2010 | Fish |
| 7,907,211 B2 | 3/2011 | Oostveen et al. |
| 7,976,389 B2 | 7/2011 | Cannon et al. |
| 8,006,314 B2 | 8/2011 | Wold |
| 8,028,315 B1 | 9/2011 | Barber |
| 8,082,150 B2 | 12/2011 | Wold |
| 8,086,445 B2 | 12/2011 | Wold et al. |
| 8,107,674 B2 | 1/2012 | Davis et al. |
| 8,109,827 B2 | 2/2012 | Cahill et al. |
| 8,149,530 B1 | 4/2012 | Lockton et al. |
| 8,176,518 B1 | 5/2012 | Junkin et al. |
| 8,353,763 B2 | 1/2013 | Amaitis et al. |
| 8,638,517 B2 | 1/2014 | Lockton et al. |
| 8,659,848 B2 | 2/2014 | Lockton et al. |
| 8,708,789 B2 | 4/2014 | Asher et al. |
| 8,858,313 B1 | 10/2014 | Selfors |
| 9,076,303 B1 | 7/2015 | Park |
| 9,098,883 B2 | 8/2015 | Asher et al. |
| 2001/0004609 A1 | 6/2001 | Walker et al. |
| 2001/0005670 A1 | 6/2001 | Lahtinen |
| 2001/0020298 A1 | 9/2001 | Rector, Jr. et al. |
| 2001/0036272 A1 | 11/2001 | Hirayama |
| 2001/0036853 A1 | 11/2001 | Thomas |
| 2002/0010789 A1 | 1/2002 | Lord |
| 2002/0029381 A1 | 3/2002 | Inselberg |
| 2002/0037766 A1 | 3/2002 | Muniz |
| 2002/0069265 A1 | 3/2002 | Bountour |
| 2002/0042293 A1 | 4/2002 | Ubale et al. |
| 2002/0054088 A1 | 5/2002 | Tanskanen et al. |
| 2002/0055385 A1 | 5/2002 | Otsu |
| 2002/0056089 A1 | 5/2002 | Houston |
| 2002/0059623 A1 | 5/2002 | Rodriguez et al. |
| 2002/0078176 A1 | 6/2002 | Nomura et al. |
| 2002/0103696 A1 | 8/2002 | Huang et al. |
| 2002/0108125 A1 | 8/2002 | Joao |
| 2002/0108127 A1 | 8/2002 | Lew et al. |
| 2002/0115488 A1 | 8/2002 | Berry et al. |
| 2002/0124247 A1 | 9/2002 | Houghton |
| 2002/0132614 A1 | 9/2002 | Vanlujit et al. |
| 2002/0133827 A1 | 9/2002 | Newman et al. |
| 2002/0144273 A1 | 10/2002 | Reto |
| 2002/0157002 A1 | 10/2002 | Messerges et al. |
| 2002/0159576 A1 | 10/2002 | Adams |
| 2002/0162031 A1 | 10/2002 | Levin et al. |
| 2002/0165020 A1 | 11/2002 | Koyama |
| 2002/0165025 A1 | 11/2002 | Kawahara |
| 2002/0177483 A1 | 11/2002 | Cannon |
| 2002/0187825 A1 | 12/2002 | Tracy |
| 2003/0013528 A1 | 1/2003 | Allibhoy et al. |
| 2003/0023547 A1 | 1/2003 | France |
| 2003/0040363 A1 | 2/2003 | Sandberg |
| 2003/0060247 A1 | 3/2003 | Goldberg et al. |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon |
| 2003/0114224 A1 | 6/2003 | Anttila et al. |
| 2003/0144017 A1 | 7/2003 | Inselberg |
| 2003/0154242 A1 | 8/2003 | Hayes et al. |
| 2003/0177167 A1 | 9/2003 | Lafage et al. |
| 2003/0177504 A1 | 9/2003 | Paulo et al. |
| 2003/0195023 A1 | 10/2003 | Di Cesare |
| 2003/0208579 A1 | 11/2003 | Brady et al. |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2004/0014524 A1 | 1/2004 | Pearlman |
| 2004/0022366 A1 | 2/2004 | Ferguson et al. |
| 2004/0060063 A1 | 3/2004 | Russ et al. |
| 2004/0088729 A1 | 5/2004 | Petrovic et al. |
| 2004/0093302 A1 | 5/2004 | Baker et al. |
| 2004/0152454 A1 | 5/2004 | Kauppinen |
| 2004/0117831 A1 | 6/2004 | Ellis et al. |
| 2004/0117839 A1 | 6/2004 | Watson et al. |
| 2004/0128319 A1 | 7/2004 | Davis et al. |
| 2004/0148638 A1 | 7/2004 | Weisman et al. |
| 2004/0158855 A1 | 8/2004 | Gu et al. |
| 2004/0178923 A1 | 9/2004 | Kuang |
| 2004/0183824 A1 | 9/2004 | Benson |
| 2004/0198495 A1 | 10/2004 | Cisneros et al. |
| 2004/0203667 A1 | 10/2004 | Shroder |
| 2004/0203898 A1 | 10/2004 | Bodin et al. |
| 2004/0224750 A1 | 11/2004 | Al-Ziyoud |
| 2004/0242321 A1 | 12/2004 | Overton |
| 2004/0243231 A1* | 12/2004 | Overton ............... G06F 21/128 463/29 |
| 2005/0021942 A1 | 1/2005 | Diehl et al. |
| 2005/0026699 A1 | 2/2005 | Kinzer et al. |
| 2005/0043094 A1 | 2/2005 | Nguyen et al. |
| 2005/0076371 A1 | 4/2005 | Nakamura |
| 2005/0060219 A1 | 5/2005 | Ditering et al. |
| 2005/0097599 A1 | 5/2005 | Potnick et al. |
| 2005/0101309 A1 | 5/2005 | Croome |
| 2005/0113164 A1 | 5/2005 | Buecheler et al. |
| 2005/0131984 A1 | 6/2005 | Hofmann et al. |
| 2005/0138668 A1 | 6/2005 | Gray et al. |
| 2005/0210526 A1 | 9/2005 | Levy et al. |
| 2005/0235043 A1 | 10/2005 | Teodosiu et al. |
| 2005/0255901 A1 | 11/2005 | Kreutzer |
| 2005/0266869 A1 | 12/2005 | Jung |
| 2005/0273804 A1 | 12/2005 | Preisman |
| 2005/0288101 A1 | 12/2005 | Lockton et al. |
| 2005/0288812 A1 | 12/2005 | Cheng |
| 2006/0025070 A1 | 2/2006 | Kim et al. |
| 2006/0046810 A1 | 3/2006 | Tabata |
| 2006/0047772 A1 | 3/2006 | Crutcher |
| 2006/0059161 A1 | 3/2006 | Millett et al. |
| 2006/0063590 A1 | 3/2006 | Abassi et al. |
| 2006/0087585 A1 | 4/2006 | Seo |
| 2006/0089199 A1 | 4/2006 | Jordan et al. |
| 2006/0111168 A1 | 5/2006 | Nguyen |
| 2006/0135253 A1 | 6/2006 | George et al. |
| 2006/0148569 A1 | 7/2006 | Beck |
| 2006/0156371 A1 | 7/2006 | Maetz et al. |
| 2006/0174307 A1 | 8/2006 | Hwang et al. |
| 2006/0183548 A1 | 8/2006 | Morris et al. |
| 2006/0205483 A1 | 9/2006 | Meyer et al. |
| 2006/0248553 A1 | 11/2006 | Mikkelson et al. |
| 2006/0269120 A1 | 11/2006 | Mehmadi et al. |
| 2007/0004516 A1 | 1/2007 | Jordan et al. |
| 2007/0019826 A1 | 1/2007 | Horbach et al. |
| 2007/0037623 A1 | 2/2007 | Romik |
| 2007/0083920 A1 | 4/2007 | Mizoguchi et al. |
| 2007/0093296 A1 | 4/2007 | Asher |
| 2007/0106721 A1 | 5/2007 | Schloter |
| 2007/0129144 A1 | 6/2007 | Katz |
| 2007/0147870 A1 | 7/2007 | Nagashima et al. |
| 2007/0162328 A1 | 7/2007 | Reich |
| 2007/0219856 A1 | 9/2007 | Ahmad-Taylor |
| 2007/0226062 A1 | 9/2007 | Hughes et al. |
| 2007/0238525 A1 | 10/2007 | Suomela |
| 2007/0243936 A1 | 10/2007 | Binenstock et al. |

(56) References Cited

U.S. PATENT DOCUMENTS

| | | |
|---|---|---|
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2007/0265089 A1 | 11/2007 | Robarts |
| 2008/0076497 A1 | 3/2008 | Kiskis et al. |
| 2008/0146337 A1 | 6/2008 | Halonen |
| 2008/0169605 A1 | 7/2008 | Shuster et al. |
| 2008/0248865 A1 | 10/2008 | Tedesco |
| 2008/0270288 A1 | 10/2008 | Butterly et al. |
| 2008/0288600 A1 | 11/2008 | Clark |
| 2009/0163271 A1 | 9/2009 | George et al. |
| 2009/0228351 A1 | 9/2009 | Rijsenbrij |
| 2009/0234674 A1 | 9/2009 | Wurster |
| 2010/0099421 A1 | 4/2010 | Patel et al. |
| 2010/0099471 A1 | 4/2010 | Feeney et al. |
| 2010/0120503 A1 | 5/2010 | Hoffman et al. |
| 2010/0137057 A1 | 6/2010 | Fleming |
| 2010/0279764 A1 | 11/2010 | Allen et al. |
| 2011/0130197 A1 | 6/2011 | Bythar et al. |
| 2011/0227287 A1 | 9/2011 | Reabe |
| 2011/0269548 A1 | 11/2011 | Barclay et al. |
| 2012/0264496 A1 | 10/2012 | Behrman et al. |
| 2012/0282995 A1 | 11/2012 | Allen et al. |
| 2013/0005453 A1 | 1/2013 | Nguyen et al. |
| 2014/0100011 A1 | 4/2014 | Gingher |
| 2014/0128139 A1 | 5/2014 | Shuster et al. |
| 2014/0279439 A1 | 9/2014 | Brown |
| 2014/0378212 A1 | 12/2014 | Sims |
| 2015/0067732 A1 | 3/2015 | Howe et al. |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1989 |
| WO | 01/65743 A1 | 9/2001 |
| WO | 02/03698 A1 | 10/2002 |
| WO | 2005064506 A1 | 7/2005 |
| WO | 2008027811 A2 | 3/2008 |
| WO | 2008115858 A1 | 9/2008 |

OTHER PUBLICATIONS

'Ark 4.0 Standard Edition, Technical Overview' www.twowaytv.com/version4/technologies/tech_ark_professionals.asp.

"Understanding the Interactivity Between Television and Mobile commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modeling User Behavior in Networked Games byTristan Henderson and Saleem Bhatti", www.woodworm.cs.uml.edu/rprice/ep/henderson.

"SMS Based Voting and Survey System for Meetings", www.abbit.be/technology/SMSSURVEY.html.

"PurpleAce Launches 3GSM Ringtone Competition", www.wirelessdevnet.com/news/2005/jan/31/news6html.

"On the Perfomance of Protocols for collecting Responses over a Multiple-Access Channel", Mostafa H. Ammar and George N. Rouskas, IEEE INCOMFORM '91, pp. 1490-1499, vol. 3, IEEE, New York, NY.

Merriam-Webster, "Game" definition, <http://www.merriam-webstercom/dictionary/agme.pg.1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

http://help.yahoo.com/help/us/tourn/tourn-03.html.

* cited by examiner

METHODS AND APPARATUS FOR DISTRIBUTED GAMING OVER A MOBILE DEVICE

RELATED APPLICATIONS

This patent application is a continuation of co-pending U.S. patent application Ser. No. 14/491,801, filed Sep. 19, 2014, titled "METHODS AND APPARATUS FOR DISTRIBUTED GAMING OVER A MOBILE DEVICE," which is a continuation of U.S. patent application Ser. No. 11/166,596, filed Jun. 24, 2005, titled, "METHODS AND APPARATUS FOR DISTRIBUTED GAMING OVER A MOBILE DEVICE," which claims priority under 35 U.S.C. §119(e) of the U.S. Provisional Patent Application No. 60/588,273, filed Jul. 14, 2004, entitled "A METHODOLOGY FOR PROVIDING ALL CONTESTANTS IN GAMES OF SKILL PLAYABLE ON CELL PHONES WITH THEIR CURRENT STANDING WHILE RECEIVING GAME CONTROL INFORMATION ONE-WAY VIA A 'BROADCAST' TRANSMISSION," which are all hereby incorporated by reference. This patent application also claims priority under 35 U.S.C. §119(e) of the U.S. Provisional Patent Application No. 60/583,739, filed Jun. 28, 2004, entitled "A METHODOLOGY FOR DETECTING CHEATING DURING A REAL TIME CONTEST OF SKILL UTILIZING A CELL PHONE IN CONNECTION WITH A LIVE TELEVISION PROGRAM," which is hereby incorporated by reference. The parent application, U.S. patent application Ser. No. 11/166,596, filed Jun. 24, 2005, titled, "METHODS AND APPARATUS FOR DISTRIBUTED GAMING OVER A MOBILE DEVICE," was concurrently filed with U.S. patent application Ser. No. 11/167,025, entitled METHODS AND APPARATUS FOR DISTRIBUTED GAMING OVER A MOBILE DEVICE, which is hereby incorporated by reference.

FIELD OF THE INVENTION

The present invention relates to the field of distributed gaming. More particularly, the present invention relates to the field of distributed gaming utilizing a mobile device.

BACKGROUND

Participants of distributed gaming have experienced areas of expansion in recent years. These participants are enabled to play new games and play existing games in novel over remote networks. Distributed gaming already takes a variety of forms including Internet and/or online games, as well as simple participation events, such as audience polling. Existing distributed games already pose issues in game management and control. However, several of the complex issues with distributed games have only become more difficult with the expansion into new areas and ways of gaming. One issue involves communication with the participants. Another issue is the ability to scale for large numbers of participants. These two issues make the fundamental task of keeping all the participants updated, into a significant challenge. One approach to address these issues is one-way broadcast updating. However, this broadcast or multicast approach presents significant security challenges.

Games of skill and chance have an intrinsic excitement and entertainment value. Any game is greatly enhanced by a participant's ability to know how their performance compares in relation to other participants and/or to historical performance for the game throughout the contest. However, competition will naturally create incentives to enhance performance in a manner outside the rules of the game, i.e., to cheat. Some games provide a lucrative prize based on performance, which creates even greater incentives to break the rules of the game. Network based games over the Internet, television, radio, or other complex technology utilizing a one-way multicast or broadcast system create more complicated issues in detection and prevention of cheating. Unlike a server controlled contest, there are a variety of ways unobserved competitive participants are able to unfairly manipulate a game that has such a broadcast architecture.

The State of the Art

There have been various attempts to address some of the issues raised above. Some of these attempts are mentioned below.

U.S. Pat. No. 5,013,038, filed Dec. 8, 1989, and U.S. Pat. No. 5,120,076, filed Apr. 25, 1991, both to Luxemberg, et al., (the Luxemberg patents) are directed to reducing the number of telephone calls to the game server only after the conclusion of a game. The Luxemberg '076 patent in particular, directs all but a sampling of players to delay sending their scores to the central server in a multicast request after the conclusion of the game. The central server compiles the results of the sampling and broadcasts the sampling results to all the participants of the game. Each participant then determines the participant's own chance of winning based on the sampling results taken at the conclusion of the game. Only those participants whose performance is high enough in comparison to the sampling results are released to send their results to the server for scoring. Thus, in the Luxemberg '076 patent, the number of messages over a landline telephone call to the game server is reduced to the number of participants in the sample. The game server determines the winners at the conclusion of the contest based on the uploaded scores from only the participants who have a chance of winning and who have thus uploaded their scores to the server. The Luxemberg patents ('038 and '076) also provide for the collection of market information surveys after conclusion of the game. However, the Luxemberg patents suffer from lack of real-time capability as participants must wait for each of the sample participants to dial-in their results over telephone lines. The Luxemberg patents also suffer from the inability to specifically select and connect with a statistical sample.

U.S. Pat. No. 5,083,800, filed Jun. 7, 1990, to Lockton describes using a one-way FM subcarrier (SCA) channel to broadcast from the server to game participants, while the game participants upload through telephone lines. U.S. Pat. No. 5,479,492, filed Dec. 1, 1993, to Hofstee, et al., describes voting in response to a television or radio broadcast by using a ballot box attached to a telephone line that introduces a time delay. U.S. Pat. No. 5,643,088, filed May 31, 1995, to Vaughn, et al., describes interleaved interactive advertising in the broadcasts. U.S. Pat. No. 5,813,913, filed May 30, 1995, to Berner, et al. (Berner) describes a system where players are grouped according to skill level for competition and comparison within a particular skill level. In Berner, the central computer system sends a lockout signal at the conclusion of each game where only players of the particular skill level update their performance through telephone lines.

However, none of these attempts provide for real time updating, to large numbers of participants, information regarding the standings of a game, particularly over new types of networks. One such network that shows promise is a network for mobile devices such as a cellular network. Moreover, none of the prior techniques address the issues particular to mobile device gaming such as the unfair manipulation of technology.

SUMMARY OF THE INVENTION

A system and method are provided for updating game participants. The method selects a subset of sampling participants from the set of all participants of a game. In some embodiments, the selection occurs prior to the start of the game. The method of some embodiments establishes a two-way connection between a server and each of the sampling participants. For some embodiments, the two-way connection is realtime. The method continuously maintains the two-way connection throughout the game. During each discrete game period, for example, each play of a football game, the method receives from a sampling participant, data for the sampling participant's current game period performance. Based on the received data, the method determines the performance for the game period and broadcasts this information to a participant. In some embodiments, the participant is a non-sampling participant. A non-sampling participant is a participant who was not selected for the set of sampling participants. In some embodiments, the non-sampling participant determines a standing relative to the other participants in the game event. Some embodiments display the determined standing. Some embodiments calculate a statistically accurate histogram from the sampling data to represent all the participants. In these embodiments, the participant's score is compared to the histogram to determine the standing.

Some embodiments of the invention provide a method and system for detecting unusual performance in a game. The game has a participant. The method calculates for the participant, a performance metric. The method compares the performance metric to a threshold value. Based on the comparison, if an unusually high score or other anomaly is detected, the method optionally connects the participant to a server. In some embodiments, the connection is for uploading a set of data from the participant to the server. The server, of some embodiments, broadcasts to the participant. The broadcast is a one-way transmission. In some embodiments, the broadcast includes a distribution based on a set of sample participants. In these embodiments, the set of sample participants comprises a representative sample of all the participants in the game. The threshold value, of some embodiments, is based on the broadcast and in some embodiments, the broadcast includes a histogram. The connecting occurs, in some embodiments, when the performance metric exceeds the threshold value. The connection, for some embodiments, includes a two-way connection. In some embodiments, the method also tracks for the participant, a participant improvement factor. The participant improvement factor is based on an average performance level for the participant. The method stores the participant improvement factor. In some embodiments, the server stores the participant improvement factor, while in other embodiments, the participant's mobile device stores the improvement factor. The threshold value, in some of these embodiments, is based on the participant improvement factor. The method of some embodiments tracks for the game, a game improvement factor. The game improvement factor is based on an average performance level for several participants in the game. The method stores the game improvement factor. The threshold value, in some of these embodiments, is based on the game improvement factor. In some embodiments, the method examines the uploaded data for particular characteristics. In some embodiments, the particular characteristics indicate the likelihood of cheating activity.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
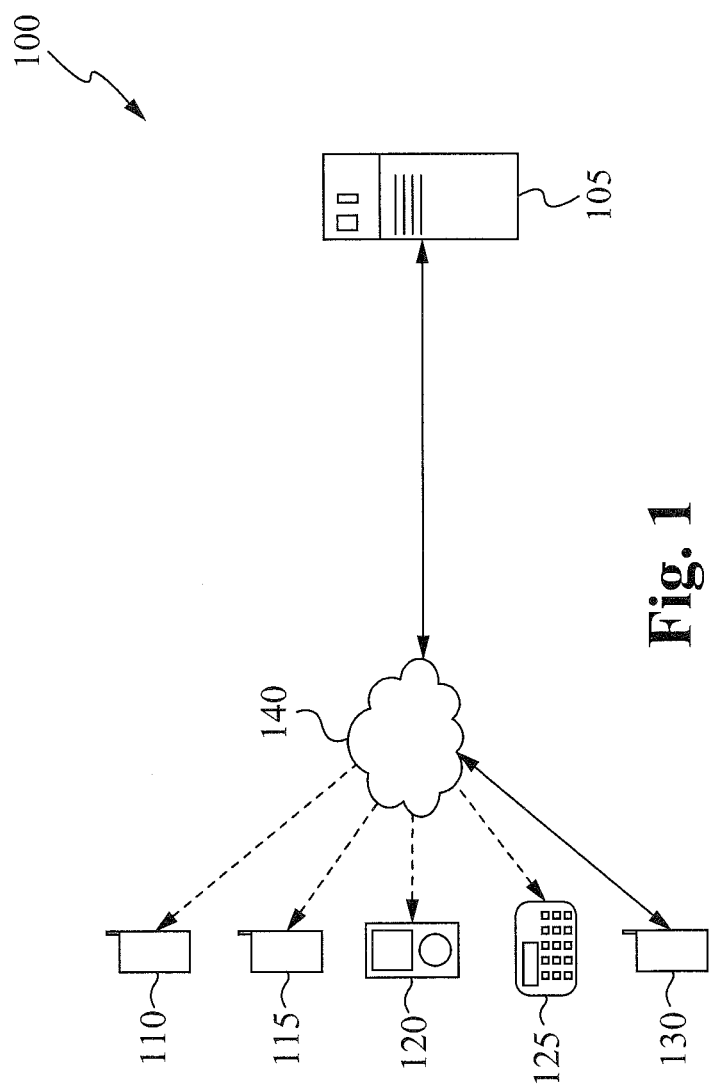
FIG. 1 illustrates a mixed topology for a network game.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail. Section I below describes notification of participants of their performance. Section II describes the detection of unusual activity for a participant that could constitute cheating. Section III describes the network cluster system implemented by some embodiments, and Section IV describes some advantages of the invention.

With the proliferation of mobile devices, a growing number of mobile device users are able to participate in a distributed online or network game. These games might be associated with various popular live and/or televised events. Participants of the game typically answer questions utilizing a mobile device as a live contestant at a game show (e.g., Wheel of Fortune®, Jeopardy®, etc.). Participants are also able to make simple predictions regarding the outcome of events and even play-by-play decisions for sporting events such as football, baseball, racing, or any of a number of other sporting events. The expansion to include participants utilizing mobile devices increases the number of participants in these network games almost limitlessly. For instance, the Super Bowl live audience numbers in the tens of thousands of spectators, while the television audience may number in excess of 100,000,000 viewers. Many of these viewers have access to an assortment of mobile devices, e.g., most commonly in the form of the ubiquitous cellular telephone.

For high bandwidth connections, games are typically controlled through a full time (two-way) connection to a game server that can routinely supply information to the participants of the game. As is known in the art, two-way network connections provide comparatively reliable and secure service. However, forming a two-way connection between the high potential number of participants of a real-time game (e.g., associated with a broadcast event) and a central host server creates challenges because of the low latency demands of such a game played in realtime. Moreover, two-way networks pose scalability issues and become impractical for massive numbers of participants and for games over low bandwidth connections such as some mobile networks. Two-way communication generates a variable cost for each additional competing participant. Ultimately, the implementation of such a two-way system could be prohibitively expensive because of the vast communication demands of continuously updating potentially millions of contestants of the status of their ongoing, changing, and fast paced predictions. This burden on the game server is significant because many games require acknowledgment by the server of the continuously changing predictions, which must be displayed on the mobile device in less than 500 milliseconds. The same problem also exists in non-television broadcast based games played over mobile devices that require a common start time for all competitors and where there are a large number of potential competitors.

I. Providing Participants with Current Standing while Receiving Game Control Information Via One-Way Broadcast A system and method are provided for updating participants in a game. In some embodiments, the method selects a set of sampling participants from the set of all participants of a game. In some of these embodiments, the selection occurs prior to the start of the game. The method of some embodiments establishes a two-way connection between a server and each of the sampling participants. The method continuously maintains the two-way connection throughout the game. After each discrete game period, the method receives from a sampling participant, data for the sampling participant's game period performance. Based on the received data, the method determines the performance for the game period and broadcasts this information to a participant. Some embodiments base the data on a statistically projectable random sample that is representative of all the participants in the game. In some embodiments, the broadcast recipient is a non-sampling participant. A non-sampling participant is a participant who was not selected for the set of sampling participants. In some embodiments, the non-sampling participant, utilizing the projectable data, determines a standing relative to the other participants for the game period.

As mentioned above, the most cost effective means of controlling a large-scale network game is to use a broadcast server topology to one-way multicast the same information to all participants simultaneously. Thus, some embodiments of the invention provide for a mobile device (e.g., cellular phone, PDA, etc.) as the receiver in a broadcast receiver topology. However, many current mobile devices are capable of operation in both one-way and two-way modes. These modes include small message service (SMS), instant messaging (IM) or Internet Relay Chat (IRC), email, voice and/or other data modes over a number of protocols such as transport control protocol (TCP) or universal datagram protocol (UDP).

Thus, the network game topology of some embodiments may include a mixture of one-way receivers and two-way clients to realize the benefits of both the one-way broadcast and two-way client/server architectures. FIG. 1 illustrates such a mixed topology 100. As shown in FIG. 1, a server 105 simultaneously broadcasts to several receivers 110-125 that are configured for one-way mode reception, while sending and receiving messages with a two-way mode client 130, through a network 140. In some embodiments, the network 140 includes a cellular network. Current mobile device technology allows the use of each mobile device connected to the network 140 to store locally certain game information such as a cumulative score. Particularly for the broadcast receivers 110-125, this relieves some burden on the server in storing and managing this data, and on the network 140 in relaying the data. As mentioned above, one advantage of the one-way architecture is reducing network and/or server latency by the distribution of data for processing and/or storage at the receiver. To implement such a topology, some embodiments employ a setup process that will be described by reference to FIG. 2.

A. Participant's Mobile Device Setup

Figure 2:
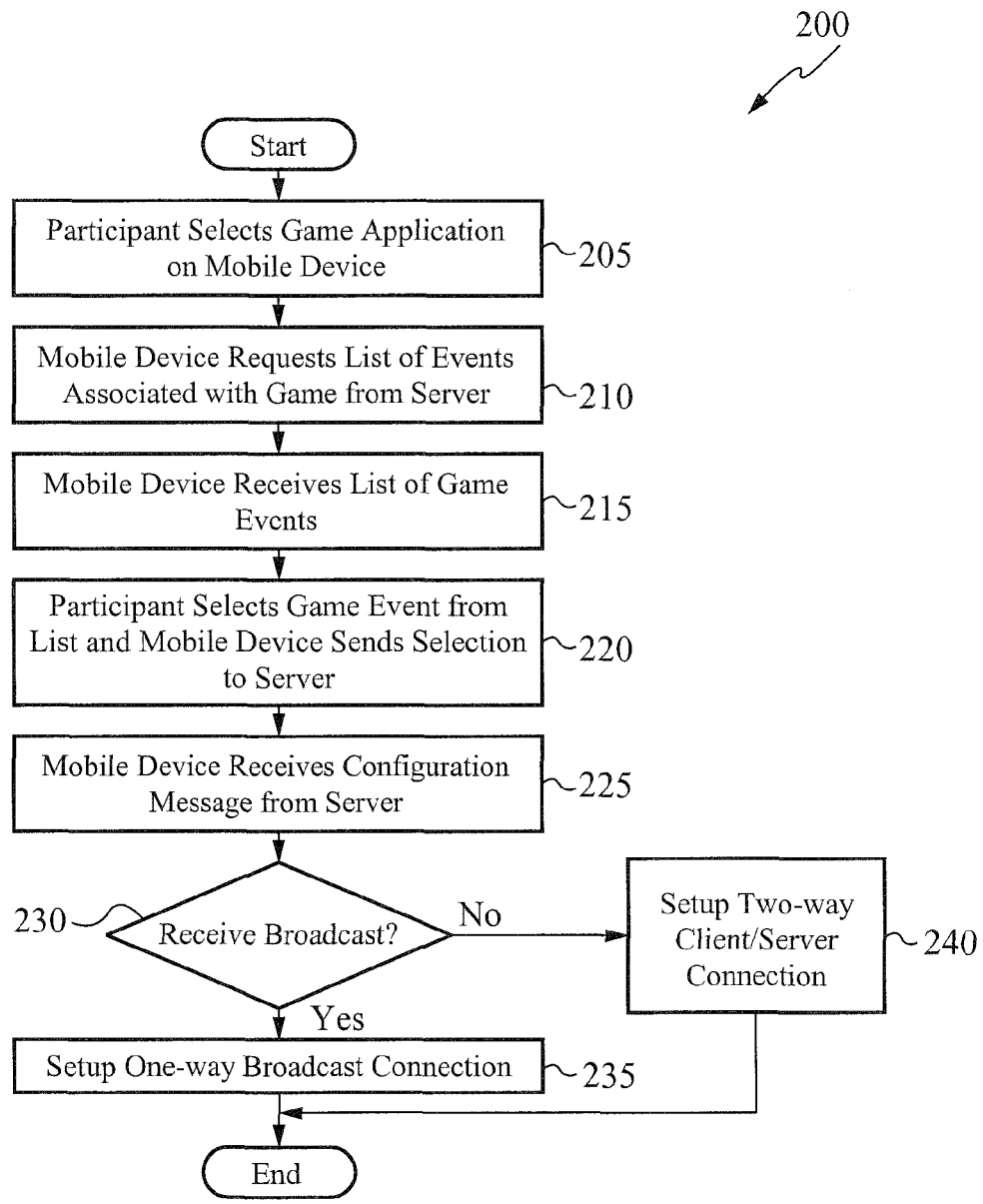
FIG. 2 illustrates a process flow for getting a schedule of events on a mobile device for a network game.

FIG. 2 illustrates a mobile device setup process 200 for getting a schedule of events on a mobile device for a network game. As shown in this figure, the mobile device set up process 200 begins at step 205, where a game participant selects a game application by using the participant's mobile device. Then the process 200 transitions to step 210, where the mobile device requests a list of game events associated with the selected game from a server, such as the server 100 represented in FIG. 1. In some embodiments, the server 100 is a single computer, while in other embodiments the server 100 takes the form of any number of computers in any number of configurations, such as a server farm or cluster. Regardless of the configuration, the server typically hosts and officiates the game for these embodiments. The server of some embodiments will be described in further detail by reference to FIGS. 4, 5, and 6.

As shown in FIG. 2, after requesting a list of events at step 210, the mobile device receives a list of game events and displays the list to the participant at step 215. At step 220, the participant selects a game event in which to compete, and sends the selection to the server. Typically, the server configures the game event for the requesting mobile device. The server configuration of some embodiments includes a determination of whether the mobile device should set up a one-way or two-way connection with the server. The configuration process by the server of some embodiments will be described in further detail by reference to FIG. 5.

When the server has configured the game event, the requesting mobile device receives a configuration message from the server at step 225 and the process transitions to step 230. At step 230, the mobile device of some embodiments determines whether the configuration message from the server indicated that the mobile device should set up for one-way broadcast mode. If the message at step 225 indicates that the mobile device should operate in broadcast mode, the process 200 transitions to step 235 where the mobile device is configured to receive one-way broadcast transmissions from the server, and then the process 200 concludes. Otherwise, the process 200 transitions to step 240 where the mobile device sets up a two-way client/server connection with the server for the selected game event, and the mobile device setup process 200 concludes.

B. Participant's Mobile Device Operation

Figure 3:
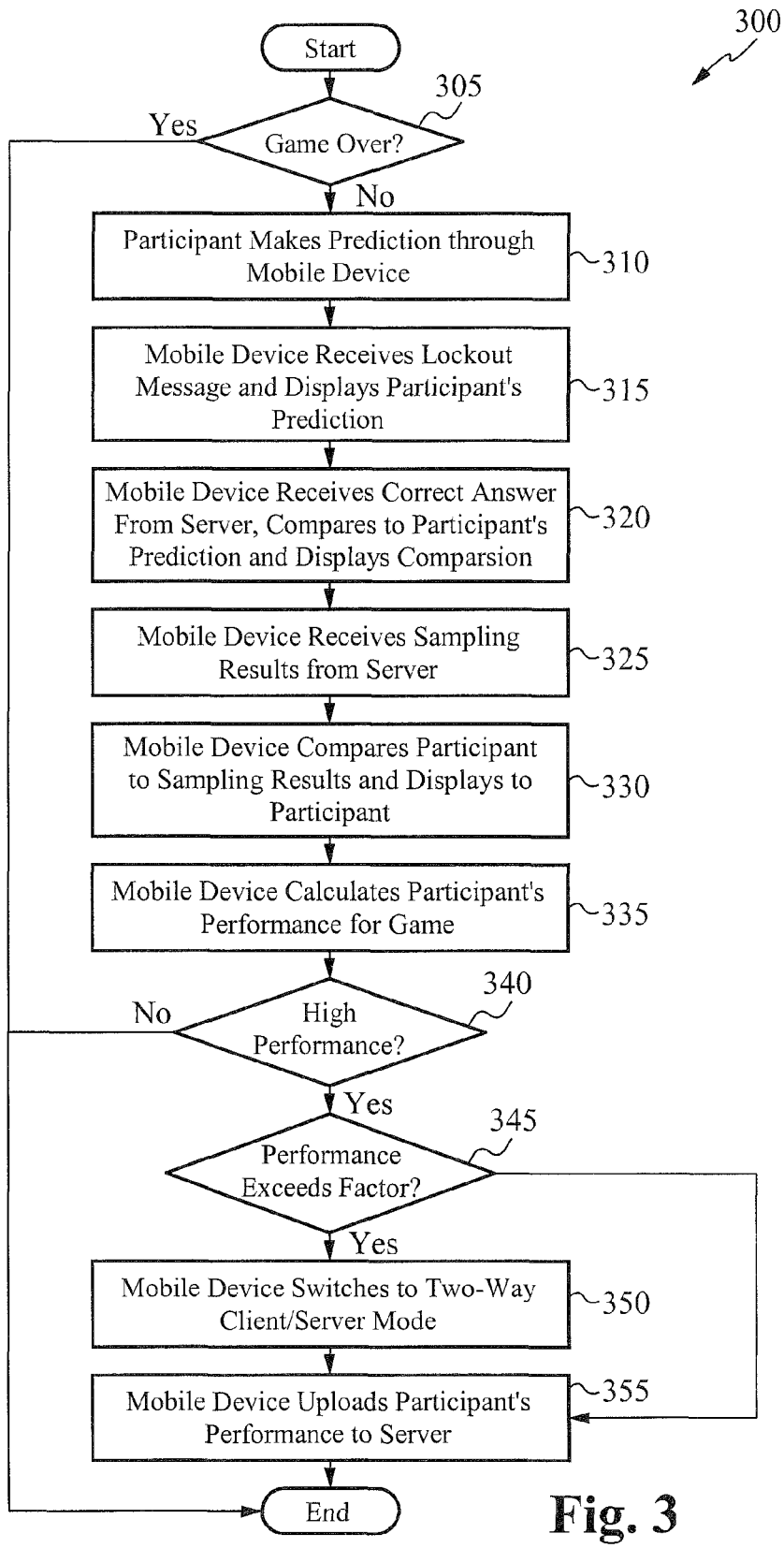
FIG. 3 illustrates a process flow for play in conjunction with a synchronized live event on a mobile device in a network game.

Once the participant has selected the game and the mobile device has prepared the connection with the server. The participant may play the game over the mobile device. FIG. 3 illustrates a mobile device operation process 300 for play in conjunction with a synchronized live event. The mobile device operation process 300 begins at step 305 where the process 300 determines whether the game is over. If the game is over, then the process 300 concludes. If the game is not over, then the process 300 transitions to step 310 where the participant makes a prediction regarding some facet of the game being played. The participant makes the prediction by using the mobile device that was set up to play the game in accordance with the set up process 200 described above in relation to FIG. 2.

As shown in FIG. 3, after the participant makes a prediction, the mobile device operation process 300 transitions to step 315 when the mobile device receives a lockout message from the server. At step 315, upon receiving the lockout message, the mobile device displays the participant's current prediction, if any, to the participant. In some embodiments, at the conclusion of each game period or scoring event, for example a football play or a baseball pitch, the server sends "lock out" signals prohibiting predictions or answers to the questions via a one-way broadcast transmission before the correct answers or facts are revealed. The participant's mobile device in these embodiments determines whether the participant's predictions or answers were: (1) entered prior to the receipt of the time stamped lock out message and (2) correct or incorrect. In some embodiments, the mobile device computes locally a cumulative score based on whether the participant was correct, as opposed to performing these calculations for each participant on a central server. Such a system has the ability to scale to accommodate a potentially large number of participants from a huge audience. The lockout message and whether a game is over will be described later by reference to FIG. 6.

After the mobile device receives a lockout message at step 315, the process 300 transitions to step 320 where the mobile device receives the correct answer from the server, compares the received answer to the participant's prediction, and displays the comparison to the participant. Then, at step 325, the mobile device receives a set of sampling results from the server. Prior to the commencement of the game, the server of some embodiments selects a statistically significant random sample of participants who have registered their intention to play the game. The server instructs these sampling participants' mobile devices to establish with the server a two-way connection to be maintained for the duration of the contest or game. Some embodiments establish the two-way connection transparently, which occurs with or without the participant's knowledge. The server of some embodiments monitors the period-by-period scores of this statistically significant set of sampling participants. In some embodiments, the sampling results contain a distribution of the performance of the sampling participants for the last period of the game that was tabulated. Some of these embodiments employ a histogram format to represent the sampling results.

After each discrete period in the contest, the server of some embodiments broadcasts some of the information collected from the sampling participants as well as the correct answers or predictions for each game period. In some of these embodiments, the game application software residing in the mobile device will compare the participant's current score to the sampling results. For example, a participant who won the maximum number of points possible on their last prediction might be informed they had moved up from the 72nd percentile to the 89th percentile at that point in the game. Some embodiments further provide a visual display of the current percentile standing for the participant based upon the comparison of the participant's score to the representative sample. For some of these embodiments, the sampling results include a histogram or another graphical representation of the sampling results. Generation and transmission of the sampling results will be further described below by reference to FIG. 6.

When the mobile device receives the sampling results at step 325, the process 300 transitions to step 330 where the mobile device compares the participant's performance to the sampling results and displays the comparison to the participant. Then, the process 300 transitions to step 335 where the mobile device tabulates and stores the participant's performance for the game. This tabulation and storage may include a ranking system. Once the mobile device determines the participant's performance, the process 300 transitions to step 340 where the process 300 determines whether the participant has achieved a high degree of performance. For some embodiments, a high degree of performance indicates a greater likelihood that the participant will have high enough score(s) to win. In these embodiments, the method uploads the participant's performance to the server for comparison against the uploaded results of the other high performers. Thus, these embodiments monitor only the subset of high scorers, based on the particular game parameters, to determine the winner(s).

If the participant has not achieved notable performance, the process 300 concludes. Otherwise if the participant has performed well, the process 300 of some embodiments transitions to step 345, where the process 300 determines whether the participant has exceeded one or more performance factors. If the participant has not exceeded the performance factor(s) then the process 300 transitions to step 355 where the mobile device uploads the participant's performance information to the server, and the process 300 concludes. Otherwise, the participant exceeds the performance factor and the process 300 transitions to step 350 where the mobile device switches to a two-way client/server mode. Then the mobile device uploads the participant's performance information to the server at step 355 and the process concludes.

Some embodiments use the performance determination at step 340 to check whether the participant's performance is high enough to warrant transmission to the server. In these embodiments, high performance may indicate whether the participant is likely to win. Some embodiments use the performance factor of step 345 in FIG. 3 to determine whether the participant exhibits unusual performance or activity that might constitute cheating. This topic will be further discussed in Section II. The description above regarding setup and operation of a mobile device has alluded at various times to interaction with a server. The server of some embodiments will now be described in further detail by reference to FIGS. 4, 5, and 6.

C. Server Setup

Figure 4:
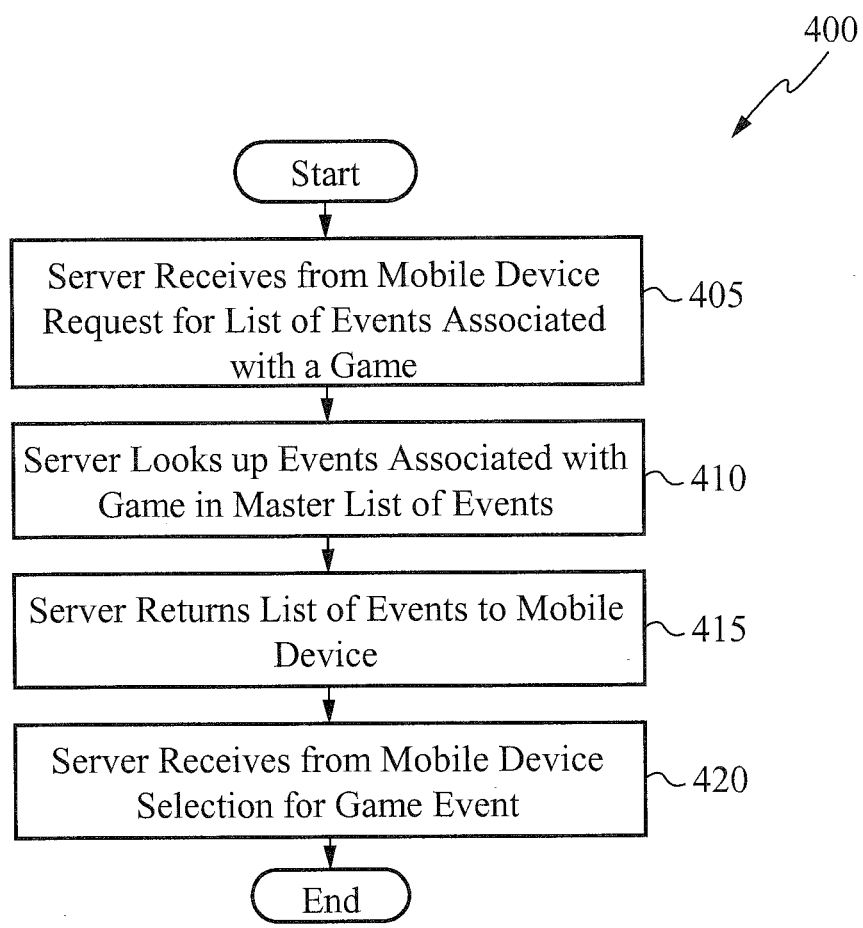
FIG. 4 illustrates a process flow for a server sending a list of schedule of events for a network game.

As mentioned above, the mixed network topology 100 illustrated in FIG. 1 employs a server 105 to operate and officiate a game that is provided to a set of heterogeneous mobile devices. As discussed above in relation to FIG. 2, the games begin by a participant selecting a game event through a mobile device, and by the mobile device requesting a list of hosted game events. FIG. 4 illustrates a server hosting process 400 for a server sending a list of schedule of events for a network game. As shown in FIG. 4, the hosting process 400 begins at step 405 where the server receives from a mobile device, a request for a list of events associated with a game. Then the process 400 transitions to step 410 where the server looks up events associated with the game in a master list of games and events. For instance, for the game of "football" the master list of games and events might include the "Super Bowl" as an event. This master list is maintained by some embodiments on a data storage. At step 415, the server returns the list of events to the requesting mobile device and waits for the mobile device to make a selection. At step 420, the server receives from the requesting mobile device a selection for a game event and then the hosting process 400 concludes.

Once the server of some embodiments receives the selection of a game event from a requesting mobile device, the server performs certain setup operations for the requested game event. In some embodiments, the server logs the mobile device and/or the participant operating the mobile device to one or more data storages maintained by the server. The server of some embodiments may request the identification explicitly, while the mobile device of other embodiments will transmit the identification separately, or in conjunction with another message to the server regardless of a specific identification request.

Figure 5:
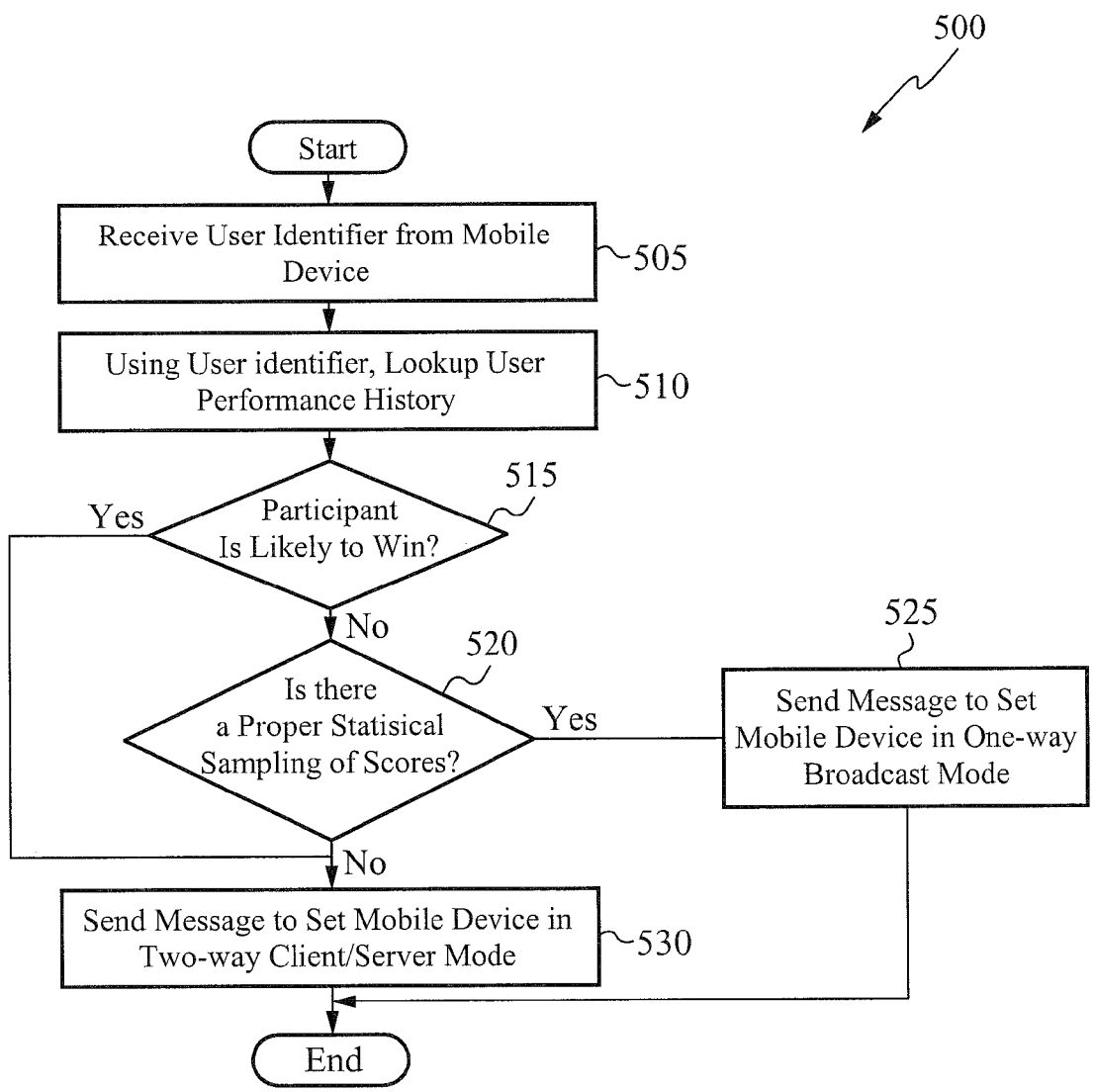
FIG. 5 illustrates a process flow for a server setting up a network game.

FIG. 5 illustrates a process 500 for a server setting up a network game. The server setup process 500 begins at step 505 when the server receives identification from the mobile device. As mentioned, this identification can represent a participant and/or the participant's mobile device. At step, 510 the server uses the received identifier to look up the performance history associated to the received identifier. The server of some embodiments may use a data storage for the lookup. Then, the process 500 transitions to step 515, where the process 500 determines based on the participant's performance history, whether the participant is likely to win. The determination of some embodiments may be an approximation of performance for the selected game event, particularly if little or no performance history has been logged to the data storages for the particular participant.

If at step 515, the participant is likely to win, then the server setup process 500 transitions to step 530 where the server sends a message to set the mobile device in a two-way client/server communications mode. In the two-way mode, the server monitors closely the participant's performance for the game event. In these embodiments, the server is constantly updated with only the most relevant data from a subset of participants who are likely to win. Otherwise, if at step 515, the participant is not likely to win, then the process 500 transitions to step 520, where the process 500 determines whether there is a proper statistical sampling of scores.

In some embodiments, the server setup process 500 determines whether the number of two-way (real-time) connections to the server is statistically significant, i.e., is sufficient to provide a reasonably reliable representation of the population of all participants in the game event. If at step 520, there is not a proper statistical sampling (e.g., there are not enough two-way connections for statistical significance) then the process 500 transitions to step 530 where the server sends a message to set the mobile device in two-way client/server mode (thus, increasing the number of two-way connections toward statistical significance), and the process 500 concludes. Otherwise, the process 500 transitions to step 525 where the server sends a message to set the mobile device in one-way mode to receive broadcasts from the server, and the server setup process 500 concludes. As mentioned above, some embodiments pre-select a set of sampling participants for two-way connections at the start of each game.

D. Server Operation

Figure 6:
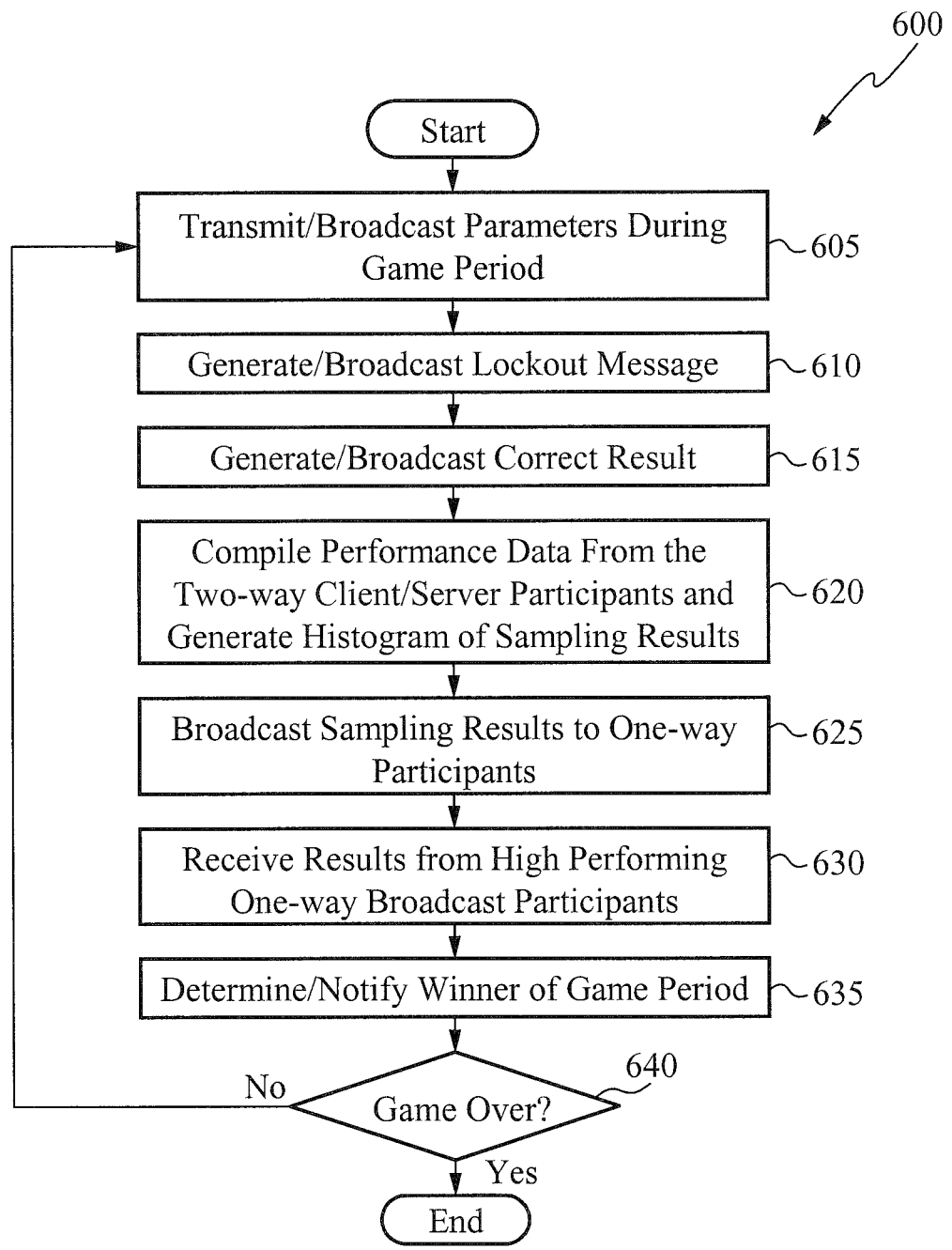
FIG. 6 illustrates a process flow for a server officiating a network game.

Once the server has set up and sent the mobile device configuration messages for the selected game, the server will then typically conduct and officiate the game. FIG. 6 illustrates a process 600 for a server officiating a network game. As shown in this Figure, the server operation process 600 begins at step 605 where the server transmits parameters and other information regarding the game to any mobile devices that have selected participation for the game period. For the mixed topology 100 illustrated in FIG. 1, mobile devices configured for one-way mode will typically receive the game information through broadcast messages from the server, while mobile devices configured for two-way mode will send and receive in a manner that is typical of client/server connections.

The transmissions and/or broadcasts will continue at step 605 until the conclusion of the game period as determined by the particular game parameters. Then the process 600 transitions to step 610 where the server generates and sends a lockout message to notify the participating or subscribed mobile devices that the game period has concluded. In some embodiments, the lockout message includes a timestamp. After the lockout message, the server generates and sends the correct result for the recently concluded game period at step 15. Then the process 600 transitions to step 620 where the server compiles the available performance data from the two-way client/server mode participants. As mentioned above, in some embodiments the two-way mode participants form a representative sample of all participants competing during the particular game period. The server operation process 600 of some embodiments generates a graphical representation of the results obtained from the representative sample of participants. Some of these embodiments use a histogram format to illustrate the sampling results.

Once the server operation process 600 compiles the sampling results at step 620, the process 600 transitions to step 625 where the server sends the sampling results to the participants of the game period. In particular, the server typically broadcasts the sampling results to the one-way mode participants. After broadcasting the sampling results, the process 600 transitions to step 630 where the server receives uploaded results from the high performing one-way mode participants. As described above in relation to FIG. 3, in some embodiments the high performing one-way mode participants determined their status as high performers based on the sampling results received from the server, and only those participants who were likely to win the game event or period upload their results to the server.

As shown in FIG. 6, after step 630, the server operation process 600 transitions to step 635 where the process 600 may perform a number of functions. For instance, the process 600 of some embodiments determines and/or notifies one or more winners of the current game event or period. The process 600 of some embodiments also makes determinations or calculations as to the categories and criteria for winners of the game event and/or period. Thus, for each discrete period a participant's score may increment or decrement by the appropriate number of points depending on the game rules. Some embodiments calculate a total and/or cumulative score for the particular participant. The details of the discrete period and the scoring typically encompasses the underlying facets of the game's subject matter such as, for example, the answer to a televised Jeopardy® question, or the results of a prediction of what play will be called by the quarterback in a televised football game.

When the server operation process 600 completes the various tasks at step 630, the process 600 transitions to step 640 where the process 600 determines whether the game, the event, and/or the period are over, based on a set of criteria specific to the selected game. If the game is not over, then the server operation process 600 returns to step 605, otherwise the process 600 concludes. As one of ordinary skill will recognize, the officiating server during an online network game does not monitor a majority of the participants, particularly the one-way broadcast participants. In a network environment of heterogeneous mobile devices, this creates opportunities for participants to unfairly modify and report their performance. Next, Section II describes the additional measures that some embodiments provide to address these concerns.

II. Detecting Cheating for a Game Played Over a Mobile Device

As mentioned above, games broadcast to mobile devices pose specific challenges as to data validation and overall game integrity. For example, a participant using a mobile device in an online or network game is able to (1) access the mobile device client to probe the microprocessor, and/or the RAM to modify the local data at the client device; (2) "spoof" or emulate another mobile client device or; (3) apply other techniques to enter predictions after the answers are known. Thus, a crafty participant is able to create game scores that are not legitimately achieved out of view of the officiating secure server and submit the unfairly achieved performance for scoring against un-enhanced legitimate competitors.

To cope with this issue, some embodiments provide a method and system for detecting unusual performance in a game. The game has a participant. In some embodiments, the game is a game of skill, which, as with most games of skill, performance improves with repetitive play, until a participant reaches their general level of skill. The method calculates for the participant an average performance level. Based on the average performance level, the method tracks for the participant, a participant improvement factor and stores the participant improvement factor. The method compares the participant improvement factor to a threshold value. As mentioned above, some embodiments make this comparison at step 345, of the process flow 300 illustrated in FIG. 3.

Some embodiments additionally track a game improvement factor (e.g., at step 635 in FIG. 6). In some of these embodiments the game improvement factor includes the average change in performance over time for all participants of the game. In some embodiments, any participant whose current game performance is exceeding either the overall game improvement factor, and/or the individual's participant improvement factor, or who is achieving a score at the very highest level of the current online players, will trigger the establishment of a two-way connection with the server for closer two-way monitoring of the participant's activity during the remainder of the game. Additionally, participants who approach a level of performance sufficient to win a significant prize, tournament points, or other reward, are also selected by some embodiments for a two-way server connection at various times during their participation of a network game. The two-way connection employs the transport control protocol (TCP) in some embodiments, while other embodiments might employ another suitable protocol. The server of some embodiments is a "game session server" provided by AirPlay Network, Inc. The system implementation of some embodiments will be described further in Section III.

Once a two-way connection is triggered, the server of some embodiments records data for the ongoing game play of the triggering participant and performs a variety of tests. The tests of some embodiments include the recording of each entry by the participant, and examining the time stamp, user input, and other data being received from the participant's mobile device. Some embodiments use the recorded data to identify anomalies in the participant's activities. The anomalies might include (1) abnormal improvement in results relative to other participants, (2) abnormal improvement in performance based on prior performance for the particular participant, (3) signs that the application software has been altered, (4) anomalies in the utilization of the game control interface, and/or (5) indications through encryption and additional non-obvious data that the final score upload has been altered.

Some embodiments, when detecting an anomaly, require future game play by the participant suspected of unfair activity to be conducted on a two-way basis with the server for close monitoring. For instance, during the game play of these embodiments, every play prediction is stored inside the mobile device and is sent periodically to the game server. Moreover, some embodiments store in a database each participant's relative performance for each game in which the participant competes. In some embodiments, the participant's relative performance is stored in the form of a percentile standing. Some embodiments calculate and store the average performance level and the average incremental improvement in the percentile standing for each participant. As participants improve over time with practice and experience, some embodiments continually calculate an average improvement factor for both the game in general, as well as for a specific participant. For instance, the average improvement in percentile standing of a specific participant for a particular game might be two percentile points, while the average improvement for a group of participants at a particular skill level game-wide, might be three percentile points.

Thus, the threshold value used by some embodiments to gauge a participant's performance may vary for each participant, and for each game, and may also vary over time. The threshold values of these embodiments are adjusted based on one or more of these or other factors (e.g., the participant and game factors, over time). Moreover, some embodiments employ multiple checks against one or more of the threshold values. For instance, the participant's improvement may not be that notable based on the participant's history but is unusual for the particular game played.

In some embodiments, information regarding the average improvement in percentile standing for a participant and/or for the group of participants within a particular skill level for the game is stored to the participant's mobile device by using software that has been loaded into the participant's mobile device memory and/or that has been downloaded with an applications program. These embodiments continuously compare each participant's current percentile standing to the stored information that includes the improvement factors previously described.

For some embodiments, information is updated in real-time. This includes updating the sampling distribution representing the game-wide performance through the (realtime) two-way connections, as well as updating the broadcast participants utilizing the one-way connections. Also previously mentioned, during play of the game, performance or scoring information may be represented in some embodiments by a histogram format, which may be displayed at various times on the participant's mobile device. The histogram of these embodiments may contain the performance of a random sample of selected participants who are continually connected to the server. In some embodiments, the mobile device might generate the histogram, while for other embodiments, the histogram is broadcast to all participants by the server. The point values to win for each game being played is different and depends upon the following, among other things: the game; the difficulty of the game; and the performance of the players playing the game. Thus, the histogram is used to track the scores of a sampling of the players and communicate those scores to all of the players during the game. Each mobile device will then be able to determine how the corresponding player is performing in the current game relative to the other players.

III. System

Figure 7:
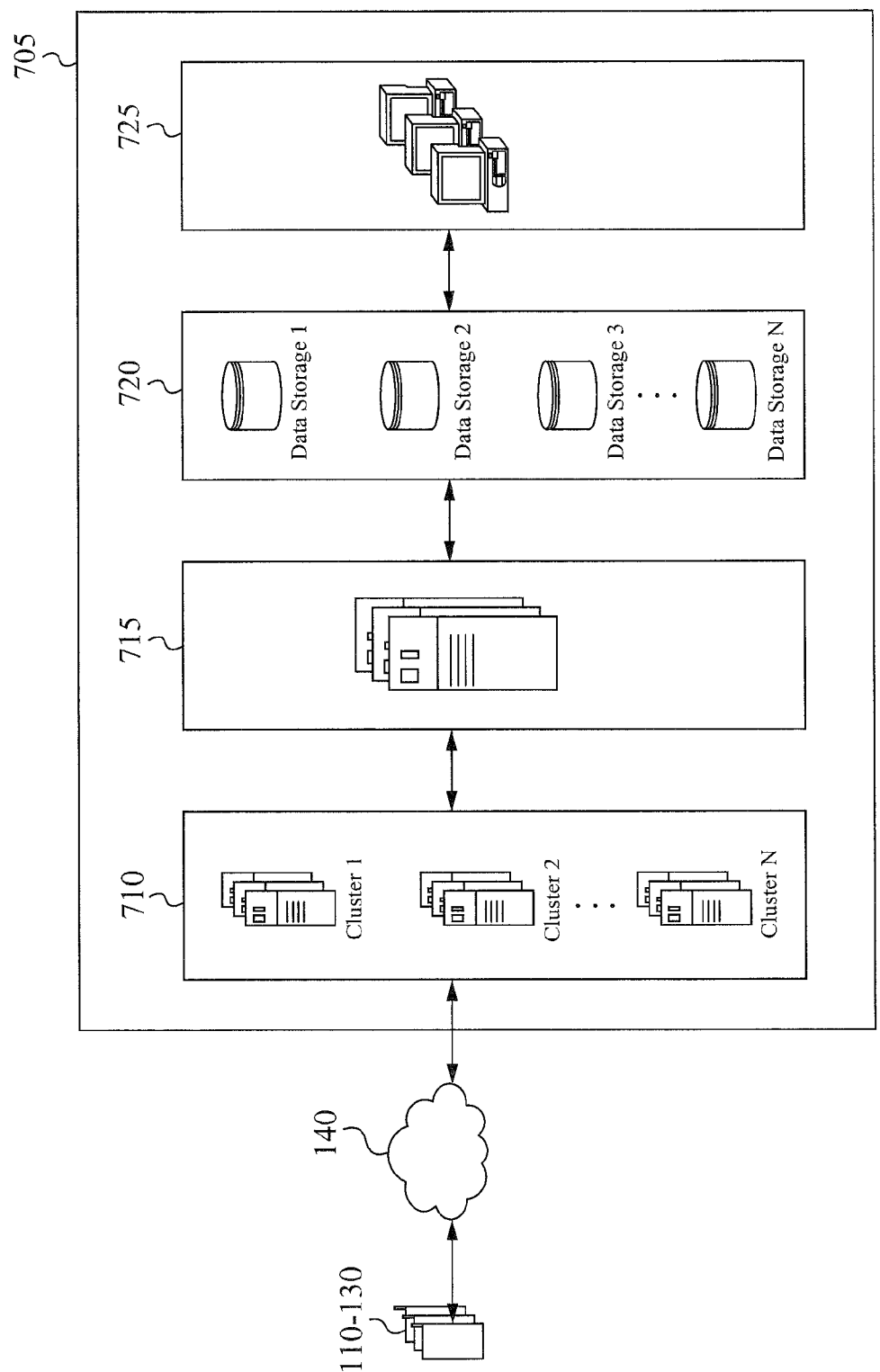
FIG. 7 illustrates the system implemented by some embodiments.

As previously mentioned, the server 105 illustrated in FIG. 1 is implemented in some embodiments by using a more complex system that includes multiple servers and/or multiple server clusters. To further illustrate this scalability feature, the server of some embodiments is depicted in FIG. 7 as a cluster or several clusters of server computers. Accordingly, FIG. 7 illustrates a system 705 implemented by some embodiments that includes a communication layer 710, a master layer 715, data storages 720, and administration tools 725. Further shown in FIG. 7, one or more mobile devices 110-130 connect to the system 705 through a network 140. As previously mentioned, the network 140 in some embodiments includes a mobile device network such as a cellular network, which employs a variety of communications protocols to transmit data both one-way and two-way between the mobile devices 110-130 and the system 705.

In some embodiments, initial messages received by the system 705 are handled by the communication layer 710. In these embodiments, the communication layer 710 might include dedicated servers to handle the communication needs of a large scale hosted network game. For instance, the communication layer 710 of some embodiments includes a Connection Cluster, a Game Session Cluster, a Score Cluster, a Broadcast Cluster, and a Web Cluster, all provided by AirPlay Network, Inc. In these embodiments, the task of sending and receiving data in the processes of, for example, setting up a game, providing an event list, providing game parameters during a game, and updating scores, is divided among the separate servers and/or clusters.

Also shown in FIG. 7, the communications layer 715 is coupled to a master layer 720. In some embodiments, the master layer 720 includes operational support for hosting and officiating the network games. In these embodiments, this hosted support might include server applications and functions for scheduling, registration, scoring, and validation. The master layer 720 often operates on massive amounts of data, thus each function in these embodiments is typically delegated to a dedicated collection of servers and/or clusters (e.g., a Schedule Cluster, a Registration Cluster, and a Scoring/Validation Cluster, also provided in some embodiments by Airplay Network, Inc.). The master layer 720 is further coupled to a set of data storages 720 to enable, for example, look ups into scheduling data such as a master schedule of games and events, user data such as participant and/or mobile device profiles and history, as well as prize data, results, metrics, and reporting data. Also shown in FIG. 7, the data storages 720 and the master layer 715 of some embodiments are coupled to a set of administration tools 725 that allow, for example, data entry and management such as scheduling and customer service functions. In these embodiments, the administration tools include user interfaces, terminals, and other appropriate administration means.

IV. Advantages

In the embodiments described above, each participant among potentially millions of participants may receive data on a one-way basis that indicates a highly accurate approximation of the participant's percentile standing after each event in real-time throughout the game. Some embodiments of the invention enable the server providing game control to utilize a one-way broadcast transmission for all but a small fraction of the participants, which significantly reduces the number of servers required to conduct a massive real time game. These embodiments also reduce the communications traffic on the cellular networks. These communications and infrastructure costs of operating the game could otherwise be insurmountable.

In addition to the benefit of providing current standings to all participants, the present invention also dramatically reduces the number of scoring calls both during and at the conclusion of an event, which represents a significant improvement over the art. The present invention establishes and maintains an ongoing two-way connection with a sample of participants throughout the game. The present invention monitors this sample and makes the information available game-wide in real-time. Therefore, the present invention does not require additional time to collect, process, and rebroadcast to the game participants instructions to later establish a two-way connection and upload scores for verification and ranking. Further, the present invention permits an almost immediate data collection, verification, and notification process, from only the most relevant group of participants in a game.

Moreover, the present invention addresses issues of integrity that are critical to a large-scale network game, which particularly may involve a number of mobile devices. A sponsor of such a large or network game offering may charge for the service and award prizes to winners. As mentioned above, the participation for such events can number potentially in the tens of millions of simultaneous subscribers, particularly by using the multicast mobile or cellular network configuration of some embodiments. However, such a game will draw little market response if the sponsor cannot maintain the integrity of the game. Issues of cheating may be addressed by employing two-way connections to closely monitor participants, but this quickly becomes impractical for large numbers of participants. Also, in some games based on rapidly unfolding events, such as a live telecast of a sporting event, the latency inherent in controlling a client utilizing a two-way connection (e.g., a cellular telephone) to a secure server makes keeping up with the telecast problematic. Some embodiments of the present invention incur the high overhead of two-way monitoring for only the set of participants who have a higher risk of cheating and/or have a high risk of winning. Such a system dramatically improves the economics of staging the network game and the quality of service for all the subscribed participants.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A method of detecting unusual performance in a broadcast web-connected game, the game having a plurality of persons who participate in the game, each on a client device, the method comprising:
   broadcasting game elements during the game from a server to each client device participating in the game;
   selecting a sampling group of persons participating in the game, the sampling group comprising a subset of all persons participating in the game;
   forming a connection between each client device used by the persons within the sampling group and the server to send responses to the game elements from the client devices of the sampling group to the server;
   broadcasting from the server to each client device participating in the game, a threshold value determined from the responses received from the sampling group;
   calculating for each person participating in the game a performance metric;
   comparing the performance metric to the threshold value thereby forming a comparison; and
   based on the comparison, for each person participating in the game not in the sampling group, optionally forming a connection to the server for uploading a set of data from the person's client device to the server.

2. The method of claim 1, further comprising determining a distribution of results from the responses received from the sampling group, wherein the distribution of results are displayed utilizing a format including one or more of a histogram, percentile and numerical ranking.

3. The method of claim 2, wherein the threshold value is based on the distribution.

4. The method of claim 1, wherein the connection to the server for persons not in the sampling group is only formed when the performance metric exceeds the threshold value.

5. The method of claim 1, wherein the connection to the server for persons not in the sampling group comprises a two-way connection.

6. The method of claim 1, further comprising:
   tracking at the client device for the person a participant improvement factor, wherein the participant improvement factor is based on an average performance level for the person; and
   storing the participant improvement factor;
   wherein the threshold value is based on the participant improvement factor.

7. The method of claim 1, further comprising:
   tracking at the server, for the game a game improvement factor, wherein the game improvement factor is based on an average performance level for the sampling group; and
   storing the game improvement factor;
   wherein the threshold value is based on the game improvement factor.

8. The method of claim 1, wherein the server logs activity for the person.

9. The method of claim 1, further comprising examining the uploaded set of data for a set of particular characteristics.

10. The method of claim 9, wherein the particular characteristics comprise:
    an indication that a client device used by the person to upload the data has been accessed abnormally; or
    an indication that the uploaded data has been altered; or
    performance data of the person that shows unusual improvement over a history of performance for the person; or
    performance data of the person that shows unusual improvement over a history of performance for a particular set of games, wherein the game is in the particular set of games.

11. The method of claim 1, wherein the connection is formed over a mobile device network.

12. The method of claim 1, further comprising sending an acknowledgment by the server to the responses which is received by the client device in less than 500 milliseconds.

13. The method of claim 1, wherein the set of data comprises a percentile standing based on score.

14. A method of detecting unusual performance in a broadcast web-connected game, the game having a plurality of persons who participate in the game, each on a client device, the method comprising:
    receiving via the client device a one-way transmission, wherein the one-way transmission comprises a set of data comprising game elements and a threshold value for the game;
    selecting a sampling group of persons participating in the game, the sampling group comprising a subset of all persons participating in the game;
    forming a connection between each client device used by the persons within the sampling group and a server to send responses to the game elements from the client devices of the sampling group to the server;
    utilizing the responses received from the sampling group at the server during the game to determine the threshold value for the game; and
    based on the threshold value for the game, optionally establishing a two-way connection with the server and one or more client devices outside of the sampling group.

15. The method of claim 14, wherein establishing the two-way connection further comprises switching the one-way connection to the two-way connection.

16. The method of claim 15, wherein the switching is performed for a single mobile device.

17. The method of claim 14, wherein the two-way connection is formed over a mobile device network.

18. The method of claim 14, wherein the set of data comprises one or more of a histogram, percentile and numerical ranking.

19. The method of claim 14, further comprising examining the mobile device.

20. The method of claim 19, wherein examining the mobile device further comprises:
    determining whether the mobile device has been accessed abnormally, or
    determining whether data stored by the mobile device has been altered; or
    determining whether the performance metric comprises an anomaly, wherein the anomaly indicates a likelihood of an unfair game.

21. The method of claim 14, wherein the set of data comprises a percentile standing based on score.

22. A server for conducting a broadcast web-connected game for a plurality of persons who participate in the game, each on a client device, and for detecting unusual performance in the game among the persons participating in the game by broadcasting game elements and a threshold value, wherein the threshold value is determined based on responses received from a subset of client devices, during the game, to each client device participating in the game and forming a two-way connection between the server and the subset of the client devices to receive responses to the game elements from the subset of client devices, determining from the received responses the threshold value, and based on the threshold value, optionally receiving from the client devices of persons not in the subset, a set of data.

23. The server of claim 22, wherein the set of data comprises one or more of a histogram, percentile and numerical ranking.

24. The server of claim 22, wherein the set of data is only received from the client devices of persons not in the subset when a performance metric of the person participating on the client device exceeds the threshold value.

25. The server of claim 22, wherein the set of data comprises a percentile standing based on score.

26. A method of detecting unusual performance in a broadcast web-connected game, the game having a plurality of persons who participate in the game, each on a client device, the method comprising:
broadcasting game elements during the game from a server to each client device participating in the game;
broadcasting from the server to each client device participating in the game, a threshold value determined from the responses received from the client devices;
calculating, at the server, for each person participating in the game a performance metric;
comparing, at the server, the performance metric to the threshold value thereby forming a comparison; and
based on the comparison, optionally receiving a set of data from the person's client device to the server; and
determining, at the server, a distribution of results from the responses received from the sampling group, wherein the distribution of results are displayed utilizing a format including one or more of a histogram, percentile and numerical ranking.

27. The method of claim 26, wherein the threshold value is based on the distribution.

28. The method of claim 26, further comprising:
tracking at the client device for the person a participant improvement factor, wherein the participant improvement factor is based on an average performance level for the person; and
storing the participant improvement factor;
wherein the threshold value is based on the participant improvement factor.

29. The method of claim 26, further comprising:
tracking at the server, for the game a game improvement factor, wherein the game improvement factor is based on an average performance level for the sampling group; and
storing the game improvement factor;
wherein the threshold value is based on the game improvement factor.

30. The method of claim 26, wherein the server logs activity for the person.

31. The method of claim 26, further comprising examining the uploaded set of data for a set of particular characteristics.

32. The method of claim 31, wherein the particular characteristics comprise:
an indication that a client device used by the person to upload the data has been accessed abnormally; or
an indication that the uploaded data has been altered; or
performance data of the person that shows unusual improvement over a history of performance for the person; or
performance data of the person that shows unusual improvement over a history of performance for a particular set of games, wherein the game is in the particular set of games.

33. The method of claim 26, wherein the connection is formed over a mobile device network.

* * * * *